United States Patent [19]

Costello

[11] Patent Number: 4,686,614

[45] Date of Patent: Aug. 11, 1987

[54] REDUCED EMI NOISE IN SWITCHED-MODE POWER SUPPLY

[75] Inventor: Louis B. Costello, Niles, Ill.

[73] Assignee: Zenith Electronics Corporation, Glenview, Ill.

[21] Appl. No.: 852,064

[22] Filed: Apr. 15, 1986

[51] Int. Cl.⁴ .......................................... H02M 3/335
[52] U.S. Cl. ...................................... 363/17; 363/40; 363/98; 363/132; 361/43
[58] Field of Search ....................... 363/17, 39, 40, 98, 363/132; 361/42, 43

[56] References Cited

U.S. PATENT DOCUMENTS

| | | | |
|---|---|---|---|
| 3,946,738 | 3/1976 | Newton et al. | 361/43 |
| 4,063,306 | 12/1977 | Perkins et al. | 363/132 |
| 4,525,774 | 6/1985 | Kino et al. | 363/17 |

*Primary Examiner*—Patrick R. Salce
*Assistant Examiner*—Anita M. Ault
*Attorney, Agent, or Firm*—Cornelius J. O'Connor; Thomas E. Hill

[57] ABSTRACT

A grounded capacitor in a switched-mode power supply provides AC line EMI filtering, reduced current leakage, and high voltage isolation. The capacitor is coupled between an AC rectifier circuit and the controlled switching devices of the power supply to provide the capacitor with a lower conduction angle, i.e., the grounded capacitor will only conduct a leakage current during periods when diodes within the rectifier circuit are conducting. The low impedance ground return path for the switching device output signal permits the use of a filter capacitor having a large capacitance which affords improved power supply line isolation and enhanced safety.

5 Claims, 1 Drawing Figure

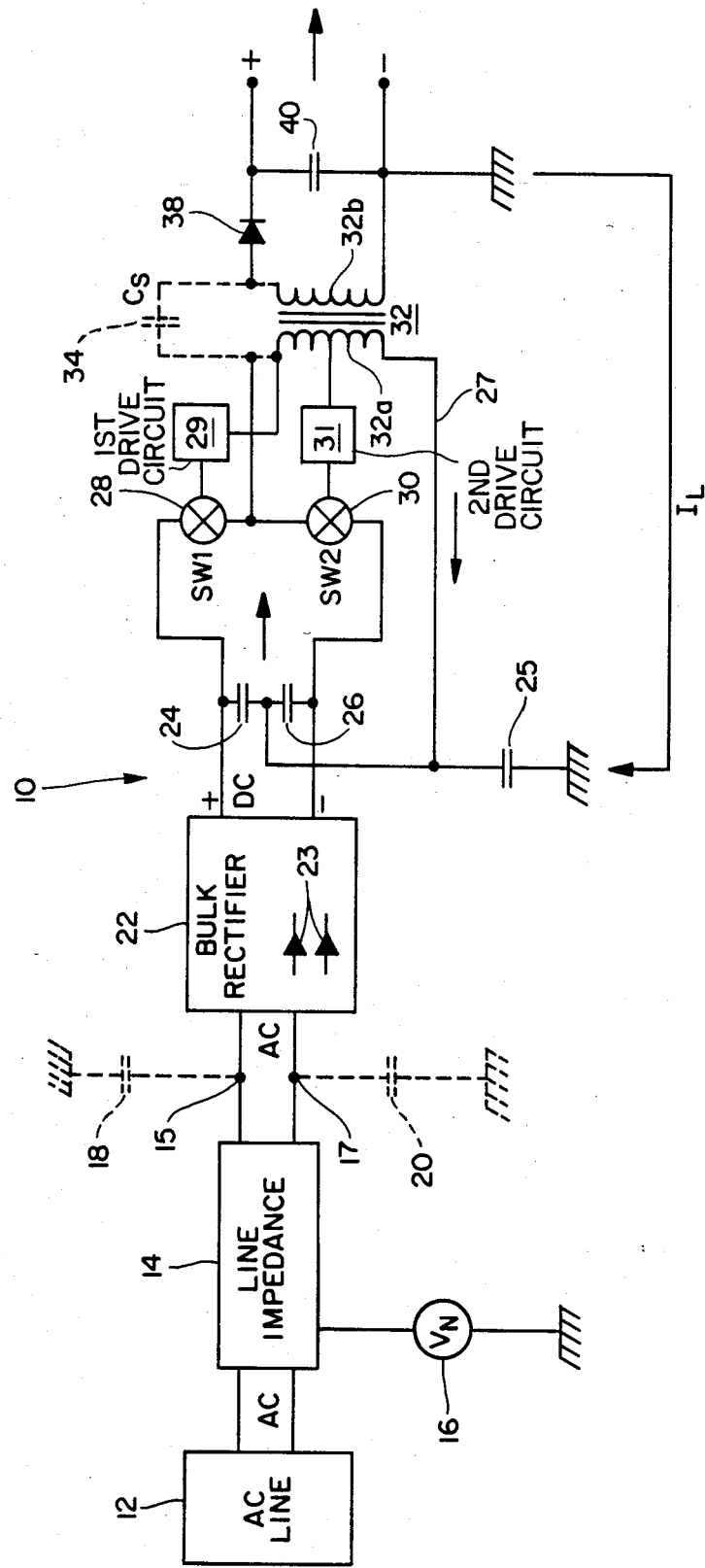

REDUCED EMI NOISE IN SWITCHED-MODE POWER SUPPLY

BACKGROUND OF THE INVENTION

This invention relates generally to switched-mode power supplies and is particularly directed to an improved AC line isolation and noise filtering arrangement in a switched-mode power supply.

In a switched-mode type of power supply, the series arrangement of a primary winding of a transformer and a controlled switch is connected to the terminals of an input voltage source, and the switch is periodically rendered conductive and in the cut-off state in an alternating manner. The duration of the conducting state of the switch is adjustable for controlling the output voltage. A rectifier is typically connected to a secondary winding of the transformer with its conduction direction established with respect to the winding sense of the secondary winding such that the rectifier conducts during the cut-off period of the switch.

Switched-mode power supplies of the type described above are used in a wide range of electronic apparatus such as television receivers and computer terminals. In an effort to maintain the AC input line unaffected by these increasing numbers of switched-mode power supply driven devices, strict limitations have been imposed upon the current which such devices may return to the AC power line. In order to reduce current leakage for safety purposes, the typical switched-mode power supply incorporates a filter arrangement having a low capacitance value. While large capacitors are more effective for filtering out higher frequency signals, i.e., on the order of the switching rate of the switching devices within the power supply, these large capacitance filters contribute to high leakage currents at the AC line frequency. Therefore, these lower frequency, leakage currents are typically fed back via ground in the switched-mode power supply. Prior art switched-mode power supplies have been unable to reconcile these competing and previously mutually exclusive operating criteria of leakage current isolation for improved safety and effective noise filtering for reduced AC line interference.

The present invention resolves the problems encountered in the prior art by providing a switched-mode power supply arrangement which provides improved high voltage isolation at low signal frequencies while filtering out higher frequency signals for minimizing current leakage to the AC line. The switched-mode power supply of the present invention provides a low impedance return path for high frequency signals in isolating them from the AC power line and also provides low capacitive value for isolation of the AC line voltage for improved safety.

OBJECTS OF THE INVENTION

Accordingly, it is an object of the present invention to provide an improved switched-mode power supply.

It is another object of the present invention to provide AC line isolation and improved safety in a switched-mode power supply.

Yet another object of the present invention is to provide for improved AC line noise filtering in a switched-mode power supply.

A further object of the present invention is to reduce the cost, simplify the construction, and improve the performance of a switched-mode power supply.

A still further object of the present invention is to provide improved AC isolation in a switched-mode power supply by limiting the time during which a current return path is available.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying Figure which illustrates in simplified schematic and block diagram form the switched-mode power supply arrangement of the present invention.

DETAILED DESCRIPTION OF THE PREFERRED EMBODIMENT

Referring to the Figure, there is shown in simplified schematic and block diagram form a switched-mode power supply 10 in accordance with the present invention. The switched-mode power supply 10 is coupled to and energized by a standard AC source or line 12. The impedance of the AC line is represented as block 14. The standard AC line 12 is further characterized as including a noise voltage $V_N$ therein which is shown in the FIGURE as a grounded noise voltage source 16. EMI noise is typically returned to the AC line 12 by current carrying ground loops in the system. The AC line 12 is shown in the FIGURE as providing an AC input via the AC line impedance block 14 and first and second input terminals 15, 17 to a bulk rectifier circuit 22. The bulk rectifier circuit 22 typically includes a plurality of diodes 23 therein which are sequentially and alternately forward biased in providing a DC output therefrom.

As shown in dotted line form in the FIGURE, a pair of prior art grounded capacitors 18, 20 are coupled between the AC line 12 and the bulk rectifier circuit 22. Grounded capacitors 18 and 20 are not included in the present invention, but are merely illustrated in phantom in the FIGURE to point out the differences between the present invention and prior art approaches. In the prior art, the grounded capacitors 18 and 20 are included to provide for filtering of the AC input signal to the bulk rectifier 22. Symmetrically arranged capacitors 18 and 20 provide a ground loop return line from the output of the switched-mode power supply 10 back to the AC line 12. The values of capacitors 18 and 20 used in the prior art are preferably large in order to provide isolation for the power supply from the AC line. However, the large capacitive values of these symmetrically arranged capacitors provides a correspondingly high impedance in this return path and, as a result, much of the return signal was provided via ground as noise directly to the AC line as shown for the $V_N$ noise source 16. Therefore, prior art switched-mode power supplies have been unable to provide a high degree of power supply isolation from the AC line as well as effective AC line isolation from ground loop return signals. The present invention provides both of these desirable features in a switched-mode power supply in a manner described in the following paragraphs.

The bulk rectifier 22 provides a DC output via capacitors 24 and 26 respectively to first and second switching devices or switches 28, 30. Capacitors 24 and 26 are ultimately charged by the DC output from the bulk rectifier 22 and are respectively discharged via the first and second switches 28, 30 in an alternating manner to the primary winding 32a of a switching transformer 32. The first and second switches 28, 30 are typically field energized transistors (FET's) which, by their alternating, sequential conductive states provide a DC voltage across the primary winding 32a of the switching transformer 32. The switching devices 28, 30 are alternately switched on, or rendered conductive, by first and second drive circuits 29, 31, respectively, which in turn are coupled to and responsive to the voltage across the primary winding 32a of the switching transformer 32. The drive circuits 29, 31 may be conventional in design and operation, do not form a part of the present invention, and thus are not further discussed herein. A feedback loop including lead 27 is coupled between the primary winding 32a of the switching transformer 32 and the serially coupled capacitors 24, 26 for controlling the operation of the first and second switches 28, 30 in regulating the voltage across the primary winding.

The switching transformer 32 includes a secondary winding 32b electromagnetically coupled to the primary winding 32a for providing a DC output voltage via the rectifying combination of diode 38 and capacitor 40. A capacitor 34 shown in dotted line form is coupled between the primary and secondary windings 32a, 32b of the switching transformer and represents the interwinding stray capacitance $C_S$ formed by the proximity of the windings when a Faraday shield is not present in the transformer. A Faraday shield is sometimes incorporated in such switching transformers in the form of one or more conductive strips such as of copper wrapped around the primary and secondary windings of the transformer to reduce the aforementioned interwinding stray capacitance $C_S$. The present invention eliminates the requirement of a Faraday shield in the switching transformer of the switched mode power supply by providing a return path for leakage current which effectively limits the leakage current to the power supply and prevents it from producing EMI noise on the AC line. The stray capacitance coupling provided by capacitor 34 causes a current at the fundamental and harmonics of the basic switching frequency of the first and second switches 28, 30 to flow in the switched mode power supply 10. The conventional return path taken by this current is ordinarily through the voltage source 16 and appears as a noise voltage $V_N$ on the AC line 12. This current also returns via the first and second "Y" filter capacitors 18, 20 which are symmetrically coupled to the AC line and by means of which the current is fed back to the first and second switches 28, 30. The current fed back via the first and second filter capacitors 18, 20 also finds its way to the AC line 12 and contributes to the EMI noise therein.

The present invention replaces the first and second filter capacitors 18, 20 with a third filter capacitor 25 which couples the lead 27 of the feedback loop to chassis ground. The feedback path of the leakage current is shortened by the manner in which capacitor 25 is coupled in the switched-mode power supply 10 as compared to the return path length of the first and second filter capacitors 18, 20. The shortened feedback path of the leakage current provided by the third filter capacitor 25 provides a lower impedance feedback path and thus increases the current fed back to the first and second switches 28, 30 while reducing the leakage current to the AC line 12.

The lower impedance of the feedback path of the leakage current $I_L$ as shown in the FIGURE permits use of a capacitance value for the third filter capacitor 25 which is lower than that of the first and second filter capacitors 18, 20. This return path provides lower impedance particularly for higher frequency signals fed back via the ground loop indicated in the FIGURE. Therefore, higher frequency signals are fed back within the switched-mode power supply 10 at a point closer to the first and second switches 28, 30 and further removed from the AC line 12 than the location of previously used first and second filter capacitors 18, 20. This arrangement results in reduced feedback of the higher frequency signals to the AC line 12 in the switched-mode power supply 10 of the present invention. The use of a lower capacitance for the third capacitor 25 in the switched-mode power supply 10 also provides improved AC line isolation in the switched-mode power supply by facilitating the discharge of charge buildups to chassis ground and preventing the accumulation of a large charge in the power supply.

Finally, the feedback path via the third filter capacitor 25 introduces the leakage current into the switched-mode power supply 10 between the bulk rectifier circuit 22 and the first and second switches 28, 30. As indicated above, the bulk rectifier 22 includes a plurality of diodes 23 for rectifying the AC input thereto and providing a DC output to the first and second switches 28, 30. In thus rectifying the AC input voltage, the diodes 23 are rendered conductive only a portion of the AC input cycle. It is only when the diodes 23 are conducting that there can be leakage of the feedback current in the switched-mode power supply to the AC line 12. By thus reducing the effective conduction angle of the leakage current feedback loop to the AC line 12, current leakage to the AC line is reduced. This is not the case for prior art first and second filter capacitors 18, 20 wherein leakage current is fed back to the AC line 12 during the entire AC input cycle.

There has thus been shown an arrangement for reducing the EMI noise introduced on an AC line by a switched-mode power supply which also provides improved high voltage AC line isolation. These two features are incorporated in a switched-mode power supply arrangement which is of simpler construction and utilizes fewer components than prior art approaches. In addition, the requirement for a Faraday shield in the switching transformer of the switched-mode power supply is eliminated by providing a lower impedance return path to the switching devices in the power supply for leakage current therein.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A switched-mode power supply circuit for converting an AC input voltage to a DC output voltage comprising:
   a pair of input terminals coupled to a source of the AC input voltage;

rectifying means coupled to said pair of input terminals for generating DC drive signals;

high frequency switching means coupled to said rectifying means for converting said DC drive signals to a plused DC voltage;

a switching transformer coupled to said high frequency switching means and responsive to said pulsed DC voltage for generating said DC output voltage, wherein said switching transformer includes a high frequency leakage current;

grounded capacitive conducting means coupled between said rectifying means and said switching means for providing a low impedance return path directly to said high frequency switching means for said high frequency leakage current; and a feedback control loop coupled to said switching transformer and between said rectifying means and said switching means, wherein said grounded capacitive means is coupled to said feed back control loop.

2. The switched-mode power supply circuit of claim 1 wherein the AC input voltage is comprised of a multi-phase signal and wherein said rectifying means is conductive for only a portion of the phases of the AC input voltage to provide a low conduction angle return path of said leakage current to the source of AC input voltage.

3. The switched-mode power supply of claim 2 wherein said rectifying means includes a plurality of diodes which are forward biased and thus rendered conductive only during said portion of the phases of the AC input voltage.

4. The switched-mode power supply circuit of claim 1 wherein said switching transformer includes a primary winding coupled to said switching means and a secondary winding electromagnetically coupled to said primary winding for generating said DC output voltage, wherein said feedback control loop is coupled to said primary winding and between said rectifying means and said switching means.

5. The switched-mode power supply circuit of claim 4 wherein said switching means includes first and second electronic switches coupled respectively to said rectifying means by first and second DC lines and wherein said switching means further includes first and second capacitors coupled in series between said first and second DC lines, with said feedback control loop coupled between said first and second capacitors and further coupled to said primary winding of said switching transformer.

* * * * *